June 25, 1929.                    C. S. DONEY                    1,718,812
                          FISH HANDLING APPARATUS
                            Filed June 24, 1927
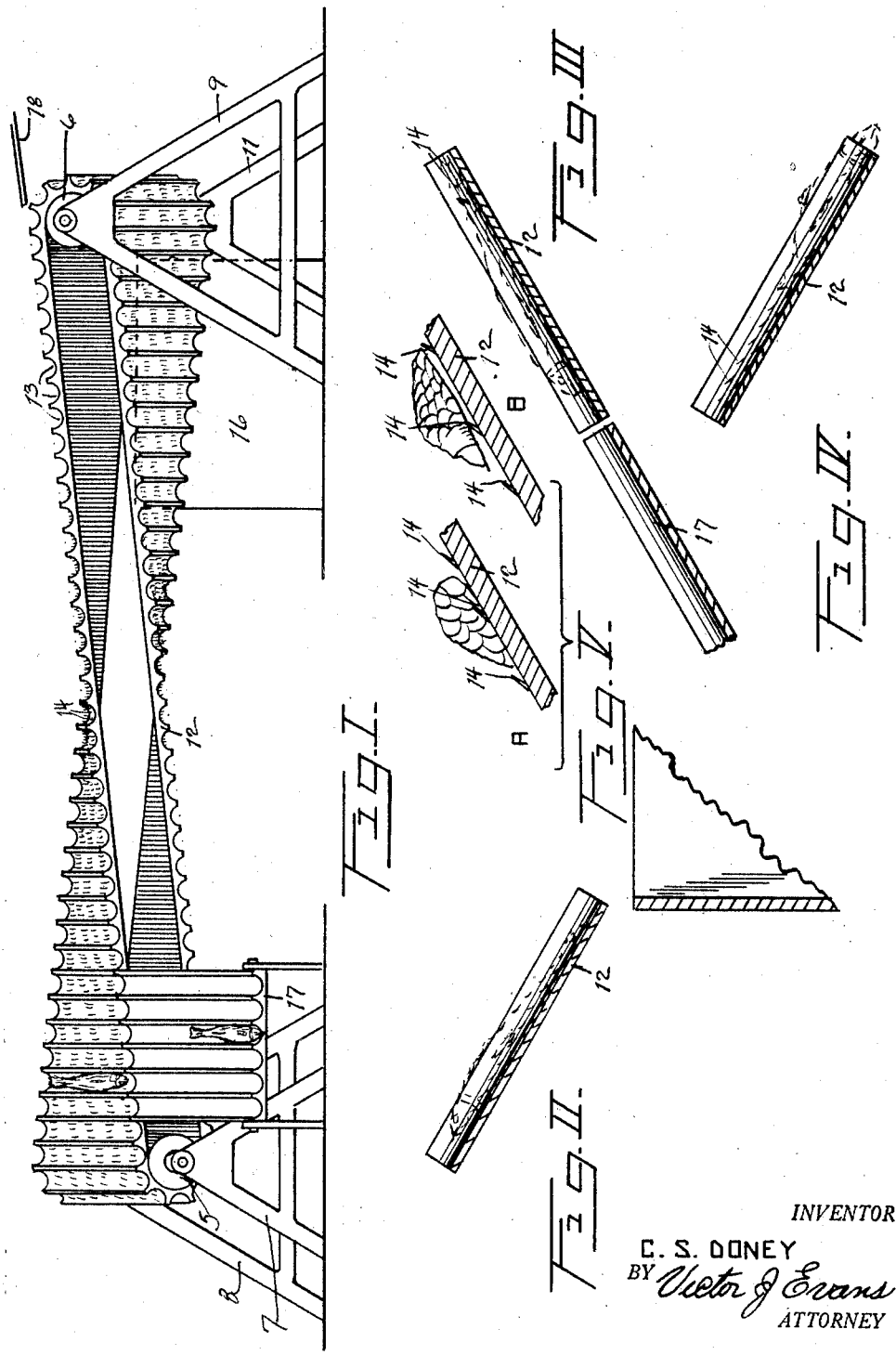
INVENTOR.
C. S. DONEY
BY *Victor J Evans*
ATTORNEY.

Patented June 25, 1929.

1,718,812

UNITED STATES PATENT OFFICE.

CALVIN SCOTT DONEY, OF SAN PEDRO, CALIFORNIA.

FISH-HANDLING APPARATUS.

Application filed June 24, 1927. Serial No. 201,246.

This invention relates to improvements in fish handling apparatus, and has particular reference to a conveyor adapted to transport fish and deliver the same with their heads all pointing in one direction.

The principal object of this invention is to produce a conveyor which will automatically discharge any fish which are turned in the wrong direction, thereby delivering all the fish remaining upon the conveyor to a suitable chute all of which fish will be headed correctly.

Another object of the invention is to produce a device of this character which is simple in construction and one which may be easily cleaned.

A further object is to produce a device of this character which is economical to manufacture and one which will require a minimum amount of labor for its operation.

Other objects and advantages will be apparent during the course of the following description.

In the accompanying drawings forming a part of this specification, and in which like numerals are employed to designate like parts throughout the same, Figure I is a side elevation of a conveyor belt constructed in accordance with my invention, Figure II is a fragmentary detail view on an enlarged scale showing the manner in which the fish will lie upon the conveyor belt if they are headed in the right direction, Figure III illustrates the position the fish will assume when the belt has reached the further end of its travel and reversed its inclination, Figure IV is a view similar to Figure II, showing the fish discharged from the conveyor belt if it is not headed in the right direction, and Figure V discloses in enlarged detail, the means for retaining the fish upon the belt.

At the present time, in the canning of sardines and other small fish, it is necessary to handle enormous quantities in order to pack economically. As these fish must be handled by hand it is a tedious and very dirty job done mostly by women. These women sort the fish by turning them so that they are all headed in the same direction after which they are conveyed to a cutter which removes the heads.

I have devised a machine wherein the fish are deposited upon a travelling conveyor having a series of parallel semi-circular grooves upon its surface, which grooves are further provided with needle-like points projecting from the surface of the grooves.

When the fish are deposited on this conveyor belt, if they are headed in the right direction their scales will become engaged by these needle-like points and the fish will be held upon the conveyor belt.

However, if the fish falls in the groove headed in the wrong direction, its scales will slip over these needle like points and the fish will move off the conveyor into a suitable bin to be later gathered up and re-deposited upon the conveyor belt.

By twisting the conveyor I have provided the necessary slant at both ends of the conveyor for retaining or depositing the fish, as the case may be.

In the accompanying drawings wherein for the purpose of illustration is shown a preferred embodiment of my invention, the numerals 5 and 6 refer to rollers supported in suitable frame work 7 and 8, and 9 and 11, respectively.

It will be noted that the frames 8 and 9 are higher than the frames 7 and 11. The result is that the shafts upon which the rollers 5 and 6 are positioned are therefore inclined. It will also be seen that the inclination at both ends of the machine are reversed with respect to each other. This results in a twist being given to the conveyor belt 12. This belt is so constructed as to be provided with a plurality of parallel grooves 13. These grooves have positioned therein upstanding needle-like points 14 which may be secured in the conveyor belt 12 in any suitable manner.

These needle-like points are best illustrated in both views of Figure V.

A bin is shown at 16 for the reception of fish which are to be re-deposited upon the conveyor. The fish which reach the far end of the conveyor are discharged in a trough 17 from which point they are carried to the cutting apparatus.

The operation of my device is as follows:—

The fish are delivered to the conveyor from a chute 18 and fall upon the conveyor. As the receiving end of the conveyor is upon a slant, it will be obvious that the fish are tending to slide off the conveyor. Due to the fact that the needle-like points 14 are projecting upwardly at this point, any fish which falls into one of the grooves 13 so that its head is projecting upwardly, will remain in the groove due to the fact that the needle-like points will catch in the scales of the fish. This is best shown in Figure V-A.

If the fish fall into the grooves with their heads pointing downwardly, the needle-like points 14 will pass over the scales and therefore the fish will move off the conveyor into the bin 16. This action is best shown in Figure V-B.

The fish which are retained upon the conveyor belt will be passed along until the inclination of the conveyor belt changes. The inclination will become such that the fish will slip off the conveyor belt due to the fact that the needle-like points 14 are now slanting downwardly and the weight of the fish will cause the same to slide off.

It will thus be seen that I have provided a very simple construction, which will accomplish all the objects herein set forth.

It is to be understood that the form of my invention herewith shown and described is to be taken as a preferred example of the same, and that various changes relative to the shape, size, material and arrangement of parts may be resorted to without departing from the spirit of the invention, or the scope of the subjoined claims.

Having thus described my invention, I claim:—

1. In a fish conveyor, a belt having its ends inclined with respect to each other, and projecting means carried on said belt for engaging the scales of a fish placed thereon.

2. In a fish conveyor, a conveyor belt having a plurality of parallel grooves formed therein inclined needle-like projections positioned within said grooves and means for retaining and discharging fish from said conveyor after the same have been deposited thereon, said means including the inclining of the ends of said belt with respect to each other.

3. In an apparatus of the character described, a pair of spaced rollers, said rollers being inclined, a conveyor belt extending between and passing over said rollers, the inclination of said rollers being such as to cause twisting of said belt, grooves formed on said conveyor belt and needle-like projections secured on the surface of said belt in the manner and for the purpose specified.

In testimony whereof I affix my signature.

CALVIN SCOTT DONEY.